(No Model.)

E. C. ATKINS.
BEDDING PLOW.

No. 588,787. Patented Aug. 24, 1897.

WITNESSES:

INVENTOR

Elias C. Atkins,
BY
Chester Bradford,
ATTORNEY.

mber of # UNITED STATES PATENT OFFICE.

ELIAS C. ATKINS, OF INDIANAPOLIS, INDIANA.

BEDDING-PLOW.

SPECIFICATION forming part of Letters Patent No. 588,787, dated August 24, 1897.

Application filed March 23, 1897. Serial No. 628,816. (No model.)

*To all whom it may concern:*

Be it known that I, ELIAS C. ATKINS, a citizen of the United States, residing at Indianapolis, in the county of Marion and State of Indiana, have invented certain new and useful Improvements in Bedding-Plows, of which the following is a specification.

My said invention relates to that class of plows known as "bedding-plows," whereby the ground is prepared in the form of long raised portions or beds, such plows being very largely used by market-gardeners, and also by agriculturists generally in wet or partially swampy regions.

Said invention consists in certain improvements whereby simplicity and efficiency of operation are secured.

A bedding-plow embodying said invention will be first fully described and the novel features thereof then pointed out in the claims.

Figure 1:
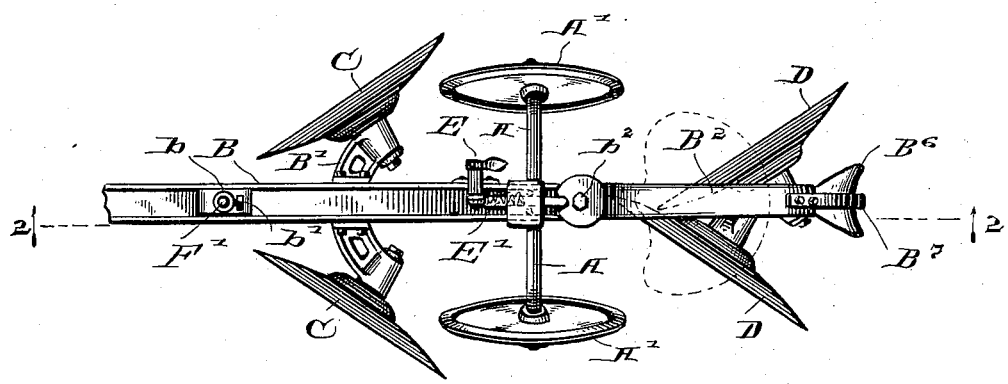
Figure 2:
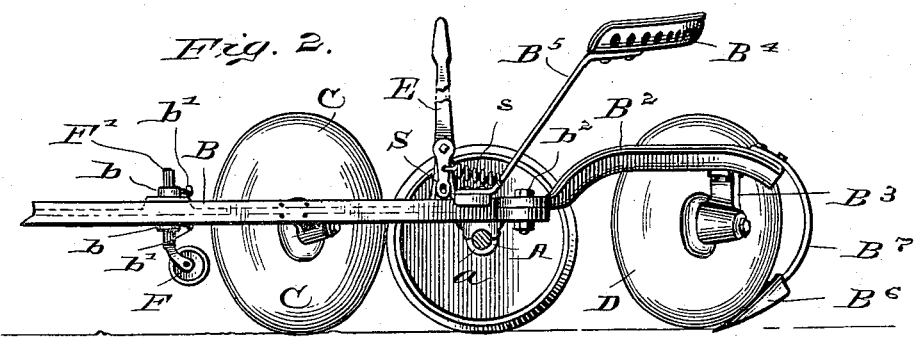
Figure 3:
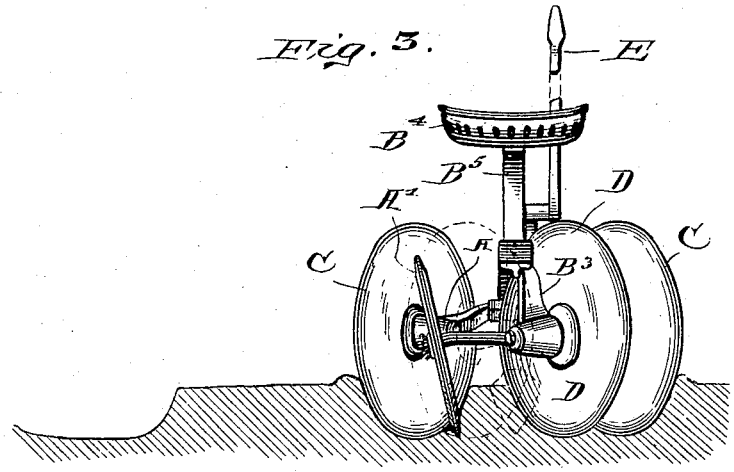

Referring to the accompanying drawings, which are made a part hereof, and on which similar letters of reference indicate similar parts, Figure 1 is a top or plan view of a plow embodying my said invention with the seat removed; Fig. 2, a longitudinal sectional view thereof as seen from the dotted line 2 2 in Fig. 1; and Fig. 3, a rear elevation with the small central plow and the rear left-hand plowing-disk removed, the positions of the two latter, however, being indicated by dotted lines.

In said drawings the portions marked A represent the axle; B, the main member of the frame; C, the forward plows; D, the rear plows; E, a lever for operating a latch-bolt, and F a caster-wheel for gaging the depth of the furrows.

The axle A is of an ordinary form, and may or may not be bent, as shown or otherwise, according to the position which it is desired that the carrier-wheels shall occupy. Upon its ends, at appropriate points, are the carrier-wheels A'. These wheels have, preferably, wedge-shaped treads, so that the extreme edge is quite thin. They are preferably "staggered" or inclined somewhat, and are adapted to travel in the furrows cut by the forward set of plowing-disks, as will be presently described. They are also preferably set with their front edges inclined slightly apart, so that their tendency in use shall be to draw outwardly or away from each other.

The main frame B is preferably an iron I-beam or casting, and is secured firmly to the axle A by means of suitable clips $a$, as best shown in Fig. 2. It has wings B', in the outer ends of which are bearings for the axles of the forward plowing-disks, said wings being of sufficient length so that said forward plowing-disks are positioned to cut the two outer of the four furrows which go to make up the bed. As above stated, and as will be readily understood, especially by an inspection of Fig. 3, the carrier-wheels A' travel in the furrows formed by these plowing-disks close to and partially upon the inclined side of the "land" left thereby, so that the smooth sides of the embankment temporarily left between these two plowing-disks hold and guide said wheels. Extending rearwardly from the main frame part B is the supplemental frame part $B^2$, which is pivoted to said main part by the pivot-bolt $b^2$. This part $B^2$ carries arms $B^3$, in which are bearings for the axles for the rear plowing-disks D. The forward end of this part $B^2$ is in the form of a disk, with a notch in its forward edge, as best shown in Fig. 1, and is controlled by a latch-bolt and lever, as will be presently described. The usual seat $B^4$ for the rider is carried by a support $B^5$, which is mounted upon the main frame part B. A small plow $B^6$ is carried from the rear end of the frame part $B^2$ by means of a suitable bar $B^7$, extending down therefrom, as best shown in Fig. 2. The purpose of this small plow $B^6$ is to cut down and level off the ridge which would otherwise be left in the center of the trench between the beds after the plowing-disks have finished their work.

The plows C and D are in themselves of a usual or any desired construction. They are shown as rotary disks. The forward pair of these plows are set far enough apart so that the land left between them is sufficient to form the two furrows, which are afterward plowed by the rear pair, which latter are positioned close together, all as plainly shown in Fig. 1.

The lever E is mounted on a suitable standard S on the frame part B and extends up in convenient reach of the driver. Its lower end is connected to a latch-bolt E', which engages with a notch in the front side of the disk formed on the forward end of the frame part B². The purpose of this is to permit the frame as a whole to yield at this point in turning corners or otherwise, while enabling it to be held rigid during the operation of plowing. In Fig. 1 this latch-bolt is shown as engaged, as when the plow is in condition for operation. By pulling on the lever the latch-bolt may obviously be withdrawn from engagement and the rear part B² left free to turn on the pivot-bolt b², which is of obvious advantage in turning the plow. The engagement is normally maintained by the spring s.

The caster-wheel F is carried on a standard F', mounted in a suitable bearing in the main frame part B at a point in front of the plowing-disks. Collars b and set-bolts b' permit such vertical adjustment of this structure as may be desired in regulating the depth of furrow in plowing.

As will be readily understood by an inspection of the drawings, the two forward plows C, which run directly in front of the carrier-wheels in cutting their furrows, leave smooth paths for said carrier-wheels and at the same time form comparatively smooth firm embankments, against which the inner sides of the treads of said carrier-wheels run. These embankments thus take the thrust of the side draft of the plow and very efficiently keep said plow in position and cause it to travel in a straight line, notwithstanding the inequalities through which the plows must pass, and which, without some such restraining influence, would cause the plow to travel irregularly and cut crooked furrows. The efficiency of the carrier-wheels for this work is increased by slightly inclining or staggering them, as shown, which may be done by bending the axles somewhat. In such bending I also prefer to incline them very slightly to the rear, so that the wheels thereon will have a tendency to draw outwardly in each direction.

Where the work is too heavy, because of the condition of the ground or otherwise, to permit the plowing to be all done at one operation, my plow can be used efficiently in two parts—that is to say, the rear plows or rear portion of the plow structure can be removed, while the first set of furrows is cut by the forward plows, and after this is done the remainder can be plowed by the rear set of plows, the forward set being removed. In each case, however, it will be observed that the smooth paths and embankments for the carrier-wheels are provided. During the first operation the wheels follow the forward set of plows, as is regularly designed, and in the second operation they still follow the same paths over which they have already passed. The vital feature of my invention, therefore, is the arrangement of the forward plows and the carrier-wheels in such relation to each other that said plows shall form paths for the carrier-wheels and leave embankments, against which said carrier-wheels may press in resisting the side draft of the plow.

Having thus fully described my said invention, what I claim as new, and desire to secure by Letters Patent, is—

1. The combination, in a bedding-plow, of a frame consisting substantially of a longitudinal bar, an axle centrally arranged and having carrying-wheels on its ends, a forward set of plows wider apart than said carrying-wheels and adapted to plow furrows in which said carrying-wheels will run, and a rear set of plows nearer together than said carrying-wheels, and adapted to plow the land between them after they have passed, substantially as shown and described.

2. The combination, in a bedding-plow, of a frame consisting of a longitudinal bar formed in two parts, the rear part being connected to the forward or main part by a pivot-joint, and provided with a notched disk formed thereon, the center of which is the pivot-point; an axle, upon which are carrying-wheels, secured to the main part of said frame; a pair of plows also secured to said main part; a pair of plows secured to said rear part; a latch-bolt mounted on said main part and adapted to engage with a notch on a disk on the rear part, and a lever for operating the same.

3. The combination, in a bedding-plow, of a main frame part, an axle rigidly secured thereto, carrying-wheels on said axle having wedge-shaped treads, a pair of plows upon the main frame part in front of said carrying-wheels and positioned relatively thereto so that said carrying-wheels will run in the furrows formed thereby close to the side of the land between them, and a second pair of plows mounted on the frame in the rear of and between the carrying-wheels whereby the land left by the forward plows may be plowed after the carrying-wheels have passed, substantially as and for the purposes set forth.

4. The combination, in a bedding-plow, of the axle A, the carrying-wheels A' thereon, the frame consisting of the parts B and B² and provided with the wings or arms B' and B³, the two sets of plows C and D mounted on said wings or arms, a pivot-joint uniting said two frame portions, a latch-bolt mounted on the main frame portion and engaging with a notch on a disk in the rear frame portion, a lever E for operating the same, a suitable seat, and an adjustable caster-wheel F, the whole being arranged and operating substantially as shown and described.

5. A bedding-plow having two sets of plows and an axle and carrier-wheels interposed between them, the forward set of plows being farther apart than and outside of the carrier-wheels, and the rear set of plows being nearer together than and between said carrier-wheels, said forward plows and said carrier-wheels being arranged in relation to each other substantially as shown and described so that the carrier-wheels will run in the furrows of said forward plows and bear against the land sides of said furrows, thus guiding and steadying the plow from both sides, substantially as and for the purposes set forth.

6. In a bedding-plow, the combination, of a frame, an axle, a pair of carrier-wheels on said axle, and a pair of plows secured to said frame in front of said axle, said plows being positioned in front of said carrier-wheels and in such relation thereto that said carrier-wheels will impinge on the banks or sides of the land left between said plows and be thus adapted to support the plow against the side draft occasioned by the plowing operation.

In witness whereof I have hereunto set my hand and seal, at Indianapolis, Indiana, this 18th day of March, A. D. 1897.

ELIAS C. ATKINS. [L. S.]

Witnesses:
CHESTER BRADFORD,
JAMES A. WALSH.